April 25, 1967 F. L. BRECHT 3,315,358
METHOD OF MAKING A DENTAL BRIDGE
Filed Oct. 2, 1963 2 Sheets-Sheet 1
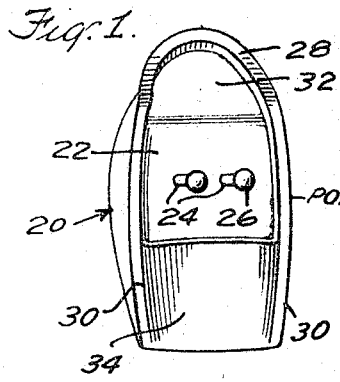
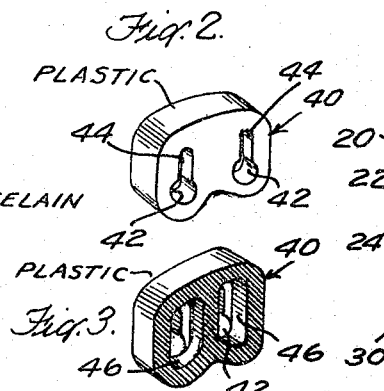
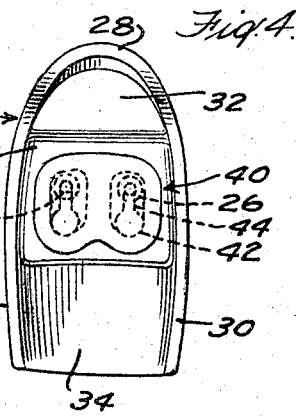
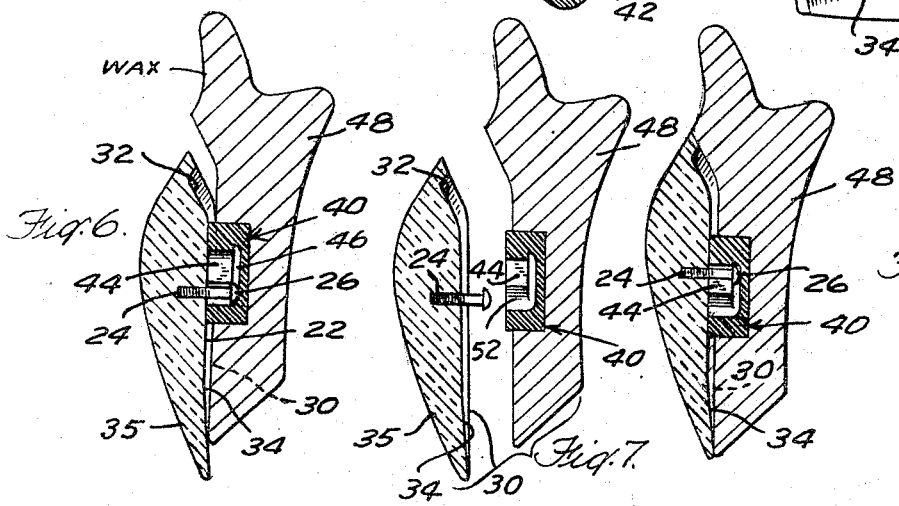
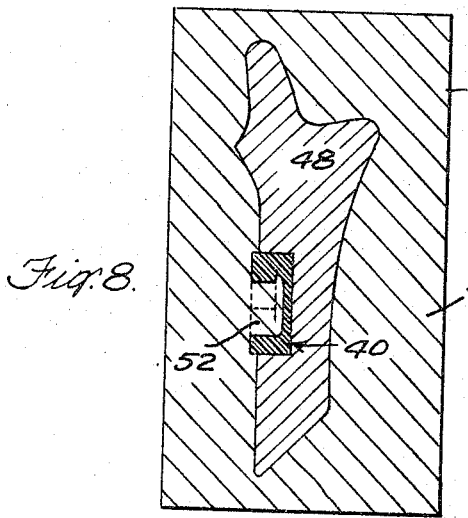
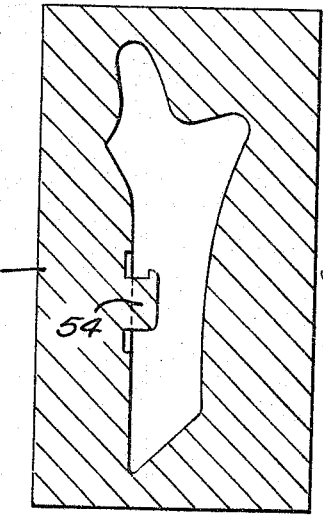
INVENTOR
FRIEDERICH L. BRECHT, DECEASED
BY CLARA ANNA BRECHT, EXECUTRIX
BY
Moses, McGlew & Toren
ATTORNEYS

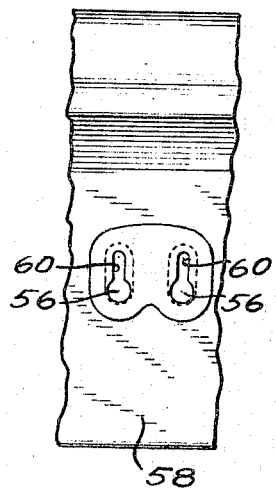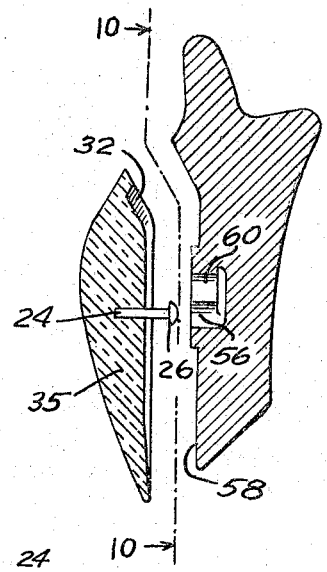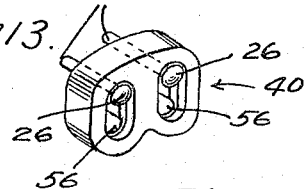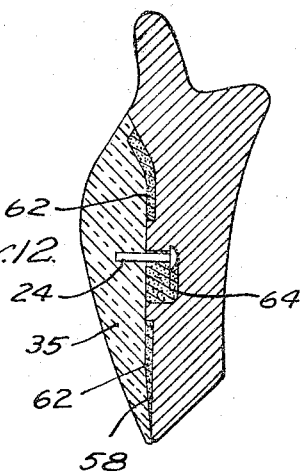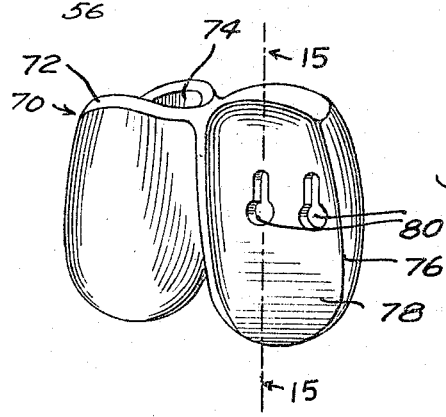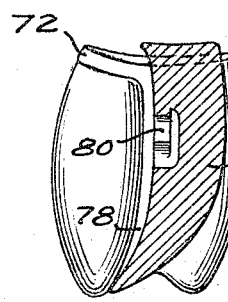

United States Patent Office 3,315,358
Patented Apr. 25, 1967

3,315,358
METHOD OF MAKING A DENTAL BRIDGE
Friederich Ludwig Brecht, deceased, late of San Francisco, Calif., by Clara Anna Brecht, executrix, San Francisco, Calif., assignor, by mesne assignments, to Westward Dental Products Company, San Francisco, Calif.
Filed Oct. 2, 1963, Ser. No. 314,089
2 Claims. (Cl. 32—6)

In the making of dentures it is customary to use artificial teeth made of porcelain or porcelain-like plastic which simulate in appearance actual teeth. These teeth are produced in large numbers in a great variety of shapes and colors so that the dentist can select the types of tooth desired and have them mounted on the denture, shaped and fitted to the mouth of the patient. Such teeth are customarily formed to carry pins having heads which may be embedded in the rubber or plastic material used to form the gum fitting portion of the denture. Teeth secured to the denture by the headed pins are found to be strong and satisfactory and do not become detached in use. The materials most commonly employed in the making of dentures are rubber or vulcanite or a hard plastic which can be formed and colored to simulate the gums. These materials are characterized by the ability to form them under a moderate amount of heat.

In the making of partial dentures or bridges, however, and also in the making of crowns carrying a tooth to fill an adjoining space where a tooth has been lost, it has been necessary to manufacture the crown or bridge wholly or partly of metal, gold for instance, so as to secure the necessary strength for the bridge or fixture. A rubber or all-plastic fixture is not suitable for this purpose, but the fixture itself must be metal or metal-faced or combined with ceramic material to simulate the gums. In many cases, metal inserts are inserted in the fixture. The artificial tooth itself must be positively secured to the metal which forms the actual seat for the tooth. Usually such bridges and crowns are produced by forming a wax model to fit the necessary space in the mouth, this model having the porcelain teeth affixed thereto so that a pattern of the exact shape for the bridge or other fixture is produced. This is used as a pattern to form a plaster mold. The wax is then melted out and the bridge, or at least the tooth supporting portions thereof, are then formed by casing with gold or other metal. Difficulty has been experienced, however, in metal casting in connection with the porcelain teeth provided with headed pins for securing the same position. Such high temperatures have to be used that the pins are heated so hot and expanded so much as to split or chip the porcelain teeth, thus rendering the product unusable.

In accordance with the present invention, means are provided by which the teeth may be detached from the wax assembly or pattern before the plaster mold is formed around the same. The plaster mold is then formed to fit the wax pattern after the porcelain teeth have been removed therefrom and thereby shaped so as to form the seats on which the porcelain teeth will fit. After the wax has been melted out, which takes place when the plaster mold is heated or cured, the molten gold or other metal is poured into the mold and the bridge or other fixture is cast in its final shape, except that the porcelain teeth are not there but instead, the metal is shaped to provide seats for the teeth including undercut sockets to receive the headed pins which are affixed to the teeth. The bridge or other fixture is then completed by replacing the teeth on the seats in the metal and moving them slightly so as to engage the heads of the pins in the undercut holes in the metal. The teeth are then cemented in this position and the completed bridge is thus formed of metal or with metal inserts with the teeth firmly interlocked therewith by means of the headed pins so that there is no danger of the teeth becoming detached from the bridge. The teeth, not having been subjected to the high temperature necessary for the casting of the metal, have not been damaged.

The invention is also applicable for use in connection with dentures if the nature of the material used for forming the denture is such that temperatures are used which might damage the teeth.

The present invention therefore has for its object a means and procedure which enables the porcelain teeth which have been used in fitting the wax model of the bridgework or the like to the mouth to be removed prior to the casting of the metal seats and then replaced and firmly fixed.

It has been proposed to remove teeth which have been mounted directly in the wax model from the wax prior to casting, but this has not been practicable because the removal of the teeth with the headed pins cannot be accomplished without the substantial destruction of the wax of the wax pattern. According to the present invention, a block or box made of suitable disposable plastic is used which is provided with keyhole-shaped holes enabling it to be attached to the tooth with the headed pin and the tooth and block embedded in the wax. The tooth is then removed from this block or box, which can be accomplished without disturbing the wax model as a whole. The plastic block or box, while firm enough to hold its shape while the tooth is removed, becomes a part of the pattern used for forming the casting mold and is destroyed by melting or volatilization when the wax pattern is melted out.

In the accompanying drawings which show certain preferred embodiments of the invention as illustrative of the principle thereof and the manner of carrying it out:

FIG. 1 is a perspective view showing the back of a typical porcelain or hard plastic tooth having the usual headed pins mounted therein;

FIG. 2 is a perspective view of the front of a disposable plastic block or box;

FIG. 3 is a perspective sectional view of the box with the back cut away;

FIG. 4 is a back view of the tooth with the block of plastic mounted thereon;

FIG. 5 is a vertical section of the tooth and plastic block mounted on the wax model of the bridge or partial denture which has been shaped to fit the gums of the patient;

FIG. 6 is a view similar to FIG. 5 showing the tooth moved down on the wax model prior to removal therefrom;

FIG. 7 shows the tooth separated from the model;

FIG. 8 is a vertical section of the model after the tooth has been removed, invested with a mold-forming substance such as, for instance, plaster of Paris;

FIG. 9 is a similar view of the mold after the wax and plastic block have been melted out;

FIG. 10 is a fragmentary front elevation of a casting made in the mold of FIG. 9 showing the tooth seat and undercut sockets for receiving the headed securing pins on the back of the tooth;

FIG. 11 is a vertical section of the casting showing the tooth about to be applied thereto;

FIG. 12 is a similar view showing the tooth permanently fixed to the bridge casting by cement and engagement of the headed pins in the sockets;

FIG. 13 is a view similar to FIG. 3 showing a modified structure of a box embodying the invention;

FIG. 14 is a perspective view of a modified application of the invention showing a tooth crown with a metal seat for an adjoining tooth fixed thereto; and FIG. 15 is a vertical section on line 15—15 of FIG. 14.

Referring to the drawings in detail, a typical porcelain tooth 20 is shown, this tooth having a slightly raised substantially flat surface 22 from which project the metal pins 24 having heads 26. The pins are permanently fixed in the porcelain. The tooth shown has slightly raised flange or edge portions 28 and 30. This formation of tooth leaves small spaces 32 and 34 between the tooth and its seat which are later filled with cement, as shown in FIG. 12. Teeth of this nature are manufactured in large quantities in a great variety of shapes and colors so that the dentist may select the exact forms and tints of teeth needed for a particular denture.

The characteristic feature of the present invention consists in the use of a block or box 40 which fits over the pin or pins 24 on the back of the tooth 20. This block has a keyhole-shaped slot formed therein for each pin, these slots each comprising a large round portion 42 big enough to pass over the head 26 and a narrow extension 44 just wide enough to let the shank of the pin 24 pass through. The back of the block preferably has recesses 46 therein to receive the heads 26. The block is made of material which is firm and solid at ordinary temperatures of the wax 48 when used to form the model or pattern of the bridge, but of sufficiently low melting or vaporizing point to melt away or disappear at temperatures which would be used to melt the wax out of the plaster of Paris mold. One suitable material for this block is a plastic known as "Duralay." This plastic can be easily molded to the desired shape. It is firm but slightly elastic so that it can conform to the surfaces of the seat and tooth. However, under moderate heat, it will vaporize and pass off in gaseous form when the wax is melted out.

The block or box 40 is fitted to the tooth and the tooth and block are incorporated in proper position in the wax when the model of the bridge is assembled and "waxed up" to fit the mouth of the patient. The tooth is then removed from the waxed-up assembly, this being possible without substantial disturbance of the wax or danger of disruption by the wax model because of the presence of the block 40, which remains in the model. The headed pins of the tooth may be unhooked from the plastic block where the tooth could not be detached from a more or less soft or fragile body of wax as would have to be done if the plastic block were not used.

The operations of removing the tooth from the model are illustrated in FIGS. 6 and 7. The model is then invested with mold making plaster 50 which enters the cavity 52 left in the block or box 40, when the tooth 35 was removed. After the plaster has hardened, the wax and the plastic block or box 40 are eliminated by heat and the mold is left in the form shown in FIG. 9, the mold having a projection or projections 54. The body of the bridge or dental fitting is then cast in metal as shown or in other hard material, or in the form of a metal insert to be incorporated in vulcanite or other bridge-forming material in any of the ways customarily practised by dental technicians. In any event, the casting is provided with under-cut recesses 56 formed by the projections 54, these recesses being the exact shape of the recesses 52 of the model or pattern. These under-cut recesses are clearly shown in FIGS. 10 and 11.

The tooth 35 is now applied to the seat 58 in the casting and moved slightly so as to interlock the headed pins with the overhanging wall portions 60 of the recesses. A settable dental cement 62 is then introduced between the tooth and its seat so as to fill any spaces between the two and particularly to provide a body 64 of the cement in the enlarged spaces adjacent to the headed pins 24. The tooth is thus locked firmly in position, it being held both by the adhesive strentgh of the cement and by the overhanging walls of the recesses from which the headed pins cannot escape. The tooth is thus as firmly attached to the bridge as if the metal were cast directly around the same but without danger or damage to the tooth.

FIG. 13 shows a modified form of the plastic block in which the keyhole-shaped slots in the block extend entirely through the block.

In FIGS. 14 and 15, a modified embodiment of the invention is shown as applied to a crown. 70 is a conventional crown having a metal body 72 in which is a recess 74 which fits on the stump of the tooth. If it is desired to add a tooth adjacent to the crowned tooth, a properly shaped body of metal 76 is cast onto or soldered to the metal of the crown. This body of metal is cast in proper shape by following the procedures described above in producing a bridge. The metal has seat 78 for the porcelain tooth (not shown), this seat being formed with undercut recesses 80 to receive the pins on the tooth.

While specific embodiments of the invention have been shown and described in detail to illustrate the application of the principles of the invention, it will be understood that this invention may be embodied otherwise without departing from such principles.

What is claimed is:
1. A method of making a dental bridge or the like, which consists in building up a form for the bridge at least partly of wax, providing an artificial tooth having at least one headed prong on the back thereof, providing a block of consumable plastic having at least one keyhole slot opening through the forward face thereof, fitting the block to the back of the tooth by inserting the headed prong into the slot and then effecting slight relative displacement of the tooth and block to engage the prong within the narrower part of the slot, incorporating the tooth and plastic block in the wax, shaping the form including the tooth to fit the mouth of the patient, removing the tooth from the plastic block while leaving the block embedded in the wax, by effecting slight relative displacement of the tooth and block to move the prong into the wider part of the slot to permit movement of the headed prong out of the slot investing the form, including the block in a settable mold material, melting out the wax and plastic block, casting metal in the mold so as to provide a metal seat to fit the removed tooth and including a keyhole slot to receive the prong thereon, and anchoring the tooth to said seat by inserting the prong into the wider part of the keyhole slot and then effecting slight relative displacement of the tooth and the metal seat to engage the prong within the narrower part of the slot.

2. In a method as claimed in claim 1, the step of introducing settable dental cement between the tooth and its seat to fill any spaces between the tooth and its seat and to provide a body of the cement in the keyhole slot around the headed prong.

References Cited by the Examiner

UNITED STATES PATENTS

| | | | |
|---|---|---|---|
| 1,465,473 | 8/1923 | Hansen | 32—6 |
| 2,269,780 | 1/1942 | Myerson | 32—71 X |
| 2,760,269 | 8/1956 | Adams et al. | 32—71 |

FOREIGN PATENTS 903,135 __ 12/1953 Germany.

ROBERT E. MORGAN, *Primary Examiner.*